United States Patent Office 2,785,156
Patented Mar. 12, 1957

2,785,156

PROCESS FOR PREPARING SULFONIC ACID DERIVATIVES OF THE REACTION PRODUCTS OF 4,4'-AZOBIPHENYL-4",4"'-DICARBONYL CHLORIDE AND AMINOANTHRAQUINONES

Paul Andrew Gygax, Wilmington, Del., assignor to E. I. du Pont de Nemours and Company, Wilmington, Del., a corporation of Delaware No Drawing. Application March 10, 1955, Serial No. 493,559

7 Claims. (Cl. 260—157)

This invention is directed to a process for the limited sulfonation of water-insoluble anthraquinone vat dyes to produce sulfo derivatives which are still water-insoluble but exhibit improved printing properties as the direct result of the sulfonation treatment while maintaining excellent wash fastness.

The dyes employed as starting materials for the sulfonation process of this invention may be selected from the class of yellow vat dyes obtained by reacting 4,4'-azobiphenyl-4",4"'-dicarbonyl chloride with aminoanthraquinone compounds to yield compounds having the general formula

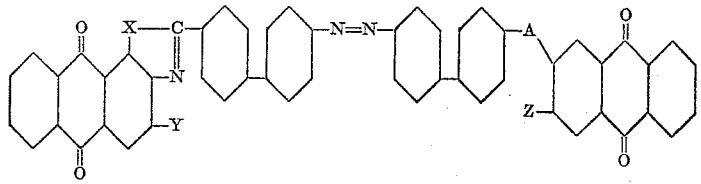

wherein A is a linkage taken from the group consisting of an oxazole ring, a thiazole ring and —CONH—, the nitrogen of which is attached to the anthraquinone nucleus at the beta position; X is taken from the group consisting of O and S and at least one of the anthraquinone 3 positions, Y and Z, is hydrogen.

The problem has existed of developing an economic process for the manufacture of high quality yellow printing vat dyes of the azobiphenyl-anthraquinone sulfonic acid series.

It is an object of this invention to produce a water-insoluble bright yellow anthraquinone vat dye possessing improved printing properties and excellent wash fastness for cotton and related fibers.

It is a further object of this novel process to prepare a vat dye wherein a greater economy of operation and unexpected desirable results of strength and faster aging are achieved.

It is old to sulfonate anthraquinone derivatives which contain azo-arylido groups, to prepare water-soluble wool dyes. Also azo-amino anthraquinone compounds containing azo-arylido groups have been sulfonated to form wool dyes. However, it is not suggested or taught in the prior art that water-insoluble vat dyes which normally have poor printing properties might be directly sulfonated to a limited degree to form water-insoluble vat dyes having improved printing properties and excellent wash fastness.

Aminoanthraquinone derivatives of 4,4'-azobiphenyl-4",4"'-dicarboxylic acid and 1,2-anthraquinone azoles derived therefrom are known to be valuable yellow vat dyes. However, these compounds, per se, have been found to be deficient in printing properties. Sulfonic acid derivatives of condensation products of 4,4'-azobiphenyl-4",4"'-dicarboxylic acid and aminoanthraquinones are claimed in U. S. P. 2,719,838, 2,719,841, 2,719,839, 2,719,840 and 2,719,842 to Deinet; however, these sulfonic acid derivatives set forth in the designated applications are prepared by condensing sulfonated aminoanthraquinones with 4,4'-azobiphenyl-4",4"'-dicarbonyl chloride in nitrobenzene. J. Deinet found that his compounds possessed good printing properties, are water-insoluble and have excellent vat dyeing properties for cotton and related fibers. These compounds of Deinet are synthesized from sulfonated anthraquinone intermediates.

The dyes of this invention have excellent affinity for cotton and related fibers despite the presence of the sulfo group which is a water-solubilizing group that is commonly used in wool dyes. However, under and over sulfonation must be avoided; a limited sulfonation is a critical factor in this invention. These novel dyes are especially suited for printing and vat dyeing.

The following is a brief outline of examples of the claimed invention:

| Ex. No. | Starting Material | Method | No. of Sulfo Groups |
|---|---|---|---|
| 1 | Oxazole-Beta-amide. | 5 p. 15% Oleum, 135°, 0.5 hr | 1.5 |
| 2 | ----do---- | 7 p. 20% Oleum, 100°, 20 min | 1.1 |
| 3 | ----do---- | 4.5 p. 45% Oleum, 80°, 0.5 hr | 1.0 |
| 4 | ----do---- | 6 p. ClSO₃H, 155°, 2.5 hrs | 1.3 |
| 5 | ----do---- | 1 p. ClSO₃H, 120°, 14 hrs., and 5 p. 100% H₂SO₄. | 0.9 |
| 6 | Bis-oxazole | 5 p. 25% Oleum, 108°, 40 min | 1.0 |
| 7 | Thiazole-Beta-amide. | 4 p. 25% Oleum, 112°, 0.5 hr | 1.3 |
| 8 | Bis-thiazole | 5 p. 30% Oleum, 110°, 0.5 hr | 1.5 |

When the products of this invention are over sulfonated, they give red and dull prints and there is a resulting loss in yield in addition to an increase of the water solubility of said product which imparts a poorer wash fastness. When under sulfonated, weak prints result. The sulfonated dyes which contain 0.9–1.5 sulfo groups per molecule give prints which are stronger and age faster than their unsulfonated counterparts. The resulting dyes are strong, bright yellow, fast vat dyes useful for both dyeing and printing cotton and related fibers.

This novel sulfonation process has been discovered to make possible the preparation of purer and more uniform compounds in addition to achieving a greater economy of operation and unexpected desirable results of strength and faster aging.

The unsulfonated vat dye used in Example 1 can be prepared according to the first paragraph of Example 4 of U. S. Patent 2,587,908 by substituting 25.8 parts of 1-chloro-2-amino-anthraquinone for 45 parts of 1,3-dibromo-2-aminoanthraquinone.

In Example 6, the unsulfonated vat dye used as starting material can be prepared by slurrying 23.3 parts of 4,4'-azobiphenyl-4'',4'''-dicarbonyl chloride and 25.8 parts of 1-chloro-2-amino-anthraquinone in 700 parts nitrobenzene containing one part pyridine, heating to 140° C. and agitating at this temperature for four hours. This mixture is heated to 205° C. and agitated at this temperature for one hour. After cooling to 120° C., 25 parts sodium carbonate, 25 parts potassium acetate, 0.5 part cupric acetate and 0.5 part cuprous chloride are added and the reaction mixture heated to 205° C. and agitated at 205–210° C. for two hours. Said mixture is cooled to 50° C. and filtered; the resulting filter cake is freed of nitro-benzene by steam distillation and then dried.

The following detailed examples are given to illustrate the invention:

Example 1

Thirty-five parts of dried, pulverized vat dye of the formula

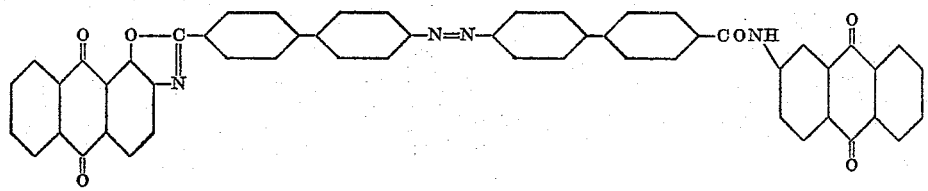

are slowly added to 175 parts of 15% oleum and the resulting solution is heated to 130° C. over a period of one-half hour. The reaction mixture is agitated at 130–135° C. for one-half hour, then cooled to 40° C. and slowly poured into an agitated, hot solution of 200 parts of sodium chloride in 2,000 parts of water. The precipitated, brown product is filtered immediately, washed acid-free with hot water and purified by bleaching with sodium hypochlorite in the presence of sodium hydroxide. The purified product is obtained in a very good yield and contains an average of 1.5 sulfonic acid groups (Na salt) per molecule. It forms an orange-yellow paste and gives strong, bright yellow dyeings and prints on cotton or related fibers.

Example 2

Twenty-five parts of the dried, unsulfonated vat dye described in Example 1 are dissolved in 175 parts of 20% oleum below 50° C. The solution is heated to 95° C. and agitated at 95–100° C. for 20 minutes. After cooling to 40° C., the sulfonation mass is poured slowly into an agitated hot (95° C.) solution of 250 parts of sodium chloride in 2500 parts of water. The precipitated product is filtered, washed acid-free with hot water and purified by bleaching with sodium hypochlorite in the presence of sodium carbonate. The purified product, which is obtained in very good yield, contains an average of 1.1 sulfonic acid groups (Na salt) per molecule. It gives dyeings and prints of strong, bright yellow shades and excellent fastness properties on cotton and related fibers.

The potassium salt of the sulfonic acid may be utilized and is obtained when potassium chloride or potassium sulfate is used in the drowning step and potassium hypochlorite and potassium hydroxide are used in the bleaching operation. The potassium salt of the dye is equivalent to the sodium salt for use in the ordinary dyeing and printing applications.

Example 3

Forty parts of the dried, unsulfonated vat dye described in Example 1 are dissolved in 180 parts of 45% oleum at 30–40° C. The solution is heated to 80° C. and agitated at 80±2° C. for one-half hour. After cooling to 35° C., the reaction mass is drowned into a hot solution of 250 parts of sodium chloride in 2500 parts of water, and the drowned mass is filtered hot. The filter cake is washed acid-free with warm water and bleached with sodium hypochlorite in the presence of sodium carbonate. The purified product contains 1.0 sulfonic acid group (Na salt) per molecule. It forms a yellow-orange paste and dyes and prints cotton or related fibers in strong, bright yellow shades of very good fastness.

Example 4

Thirty parts of the dried, unsulfonated vat dye described in Example 1 are dissolved in 180 parts of chlorosulfonic acid. The solution is heated to 145° C. and agitated at 145–155° C. for 2½ hours. After cooling to 50° C. the sulfonation mass is drowned into 3500 parts of ice water. The precipitated product is isolated by filtration and washed acid-free with water. The wet filter cake is slurried in a mixture of 500 parts of water and 25 parts of 30% caustic solution and agitated at 20–25° C. for twelve hours. The slurry is then heated to 70° C. and filtered. The filter cake is washed alkali-free with warm water and dried. The product is acid-pasted and bleached by drowning a concentrated sulfuric acid solution of the color into a hot, 10% sodium chloride solution, thereafter filtering, washing acid-free and heating an alkaline aqueous suspension of the filter cake with sodium hypochlorite. The final product which is obtained in good yield contains an average of 1.3 sulfonic acid groups (Na salt) per molecule. It dyes and prints cotton or related fibers in strong, bright yellow shades of excellent fastness properties.

Example 5

Thirty parts of the dried, unsulfonated vat dye, described in Example 1, are dissolved in 150 parts of sulfuric acid monohydrate at room temperature. While agitating, there are slowly added 30 parts of chlorosulfonic acid. The reaction mixture is then heated to 115–120° C. and agitated at this temperature for 14 hours. After cooling to 40° C., the sulfonation mass is slowly poured into a hot solution of 250 parts of sodium chloride in 2500 parts of water. The precipitated product is isolated by filtration, washed acid-free with hot water and purified by bleaching with sodium hypochlorite in the presence of sodium carbonate. The purified product contains an average of 0.9 sulfonic acid group (Na salt) per molecule. It forms a yellow-orange paste which dyes and prints cotton or related fibers in strong, bright yellow shades of excellent fastness properties.

Example 6

Twenty parts of dried, pulverized vat dye of the formula

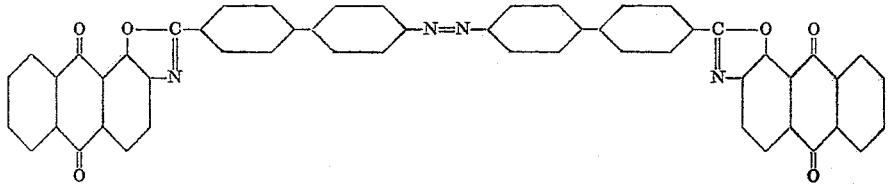

are dissolved in 100 parts of 25% oleum below 60° C. The solution is heated to 105° C., agitated at 105–108° C. for 40 minutes and then cooled to 50° C. The sulfonation mass is drowned into a hot solution of 150 parts of sodium chloride in 1500 parts of water. The insoluble sulfonated product is isolated by filtration, washed acid-free with warm water and purified by bleaching with sodium hypochlorite in the presence of sodium carbonate.

The final product, which is obtained in good yield, contains an average of one sulfonic acid group (Na salt) per molecule. It forms a yellow paste and dyes and prints cotton and related fibers in strong, bright yellow shades of excellent fastness properties.

If equimolar amounts of potassium chloride, potassium hypochlorite and potassium carbonate are substituted, respectively, for sodium chloride, sodium hypochlorite, and sodium carbonate in the drowning and bleaching operations of the above example, the potassium salt of the sulfonic acid is obtained. The latter is equivalent to the sodium salt of the dye in the printing and dyeing operations.

Example 7

Thirty-five parts of dried, pulverized vat dye of the formula

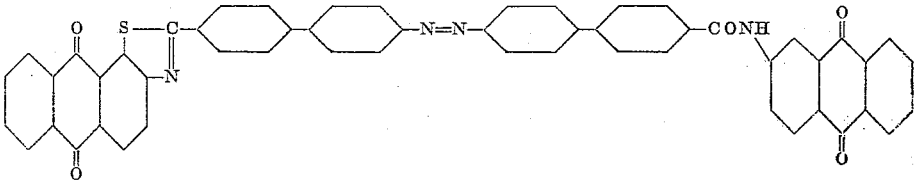

are dissolved in 140 parts of 25% oleum below 60° C. The solution is heated to 110° C. and agitated at 110–112° C. for one-half hour. The cooled reaction mass is poured slowly into a hot solution of 200 parts of sodium chloride in 2000 parts of water. The precipitated brown product is isolated by filtration, washed acid-free and purified by bleaching with sodium hypochlorite in the presence of sodium carbonate.

The purified product contains an average of 1.3 sulfonic acid groups (Na salt) per molecule. It forms a yellow-orange paste which dyes and prints cotton and related fibers in strong, bright yellow shades of very good fastness properties.

The unsulfonated vat dye used as starting material in this example can be prepared to the procedure given in the first paragraph of Example 7 of U. S. 2,587,908.

Example 8

Twenty parts of dried, pulverized vat dye of the formula

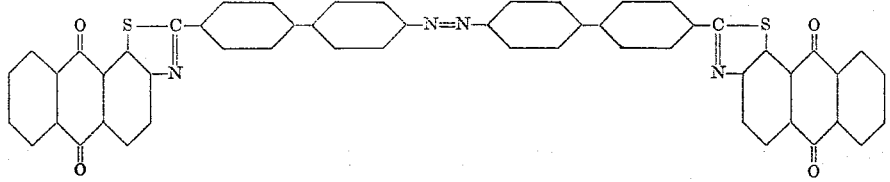

are dissolved in 100 parts of 30% oleum below 50° C. The solution is heated to 108–110° C. and agitated at this temperature for one-half hour. The sulfonation mass is then cooled to 45° C. and poured slowly into a hot solution of 150 parts of sodium chloride and 1500 parts of water. The precipitated brown product is isolated by filtration, washed acid-free with warm water and purified by bleaching with sodium hypochlorite in the presence of sodium carbonate:

The final product contains an average of 1.5 sulfonic acid groups (Na salt) per molecule. It forms an orange-yellow paste which dyes cotton and related fibers in strong, bright yellow shades of excellent fastness properties.

The unsulfonated vat dye used as starting material in this example can be prepared by the procedure described in Example 4 of U. S. 2,175,803.

The starting materials selected for purposes of this novel process will not sulfonate according to the process of this invention to give dyes of commercial interest unless said materials contain at least one nitrogen atom in an anthroquinone beta position in addition to an unblocked beta position adjacent thereto.

Examples 1–8 disclose oleum, chlorosulfonic acid and a mixture of the latter with sulfuric acid monohydrate. The minimum amount and concentration of oleum is preferably 4 parts and 10%, respectively. The selection of 4 parts as the minimum amount is based chiefly on the fact that this amount is required to provide a reaction mass that is stirrable. Example 1 provides the closest figure to this minimum, using 5 parts of the 15% oleum. Concentrations above 45% oleum tend to over-sulfonate the colors. The minimum and upper limits will give the same desired results with the specific examples set forth.

I claim:

1. A process for preparing sulfonic acid derivatives of compounds of the general formula

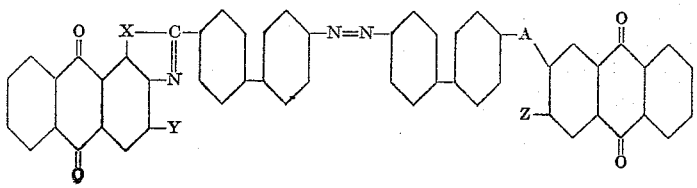

wherein A is a linkage taken from the group consisting of an oxazole ring, a thiazole ring and —CONH—, the nitrogen of which is attached to the anthraquinone nucleus at the beta position; X is taken from the group consisting of O and S and at least one of the anthraquinone 3 positions, Z and Y, is hydrogen; which process comprises heating said compounds in at least 4 parts oleum having 10 to 45% SO₃ content at a temperature between 80° C. and 155° C. to effect limited sulfonation of said compounds by introducing 0.9 to 1.5 sulfonic acid groups per molecule.

2. The process of claim 1 in which the limited sulfonation is effected by heating said compounds in chlorosulfonic acid until 0.9 to 1.5 sulfonic acid groups per molecule are introduced.

3. The process of claim 1 in which the limited sulfonation is effected by heating said compounds in a mixture of chlorosulfonic and sulfuric acids until 0.9 to 1.5 sulfonic acid groups per molecule are introduced.

4. The process of claim 1 in which the compound is

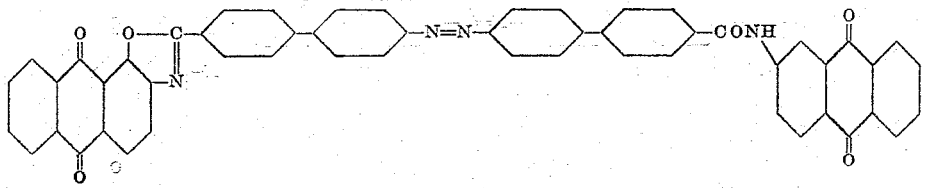

5. The process of claim 1 in which the compound is

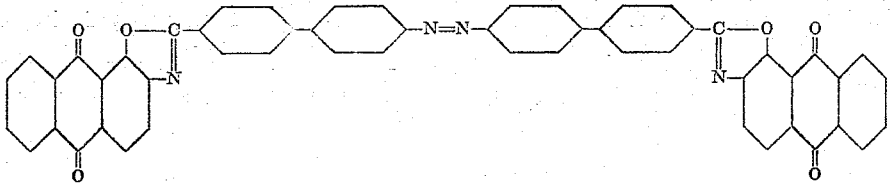

6. The process of claim 1 in which the compound is

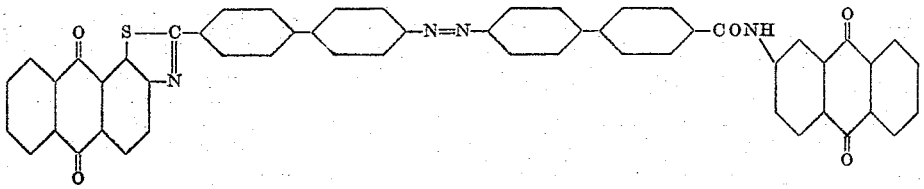

7. The process of claim 1 in which the compound is

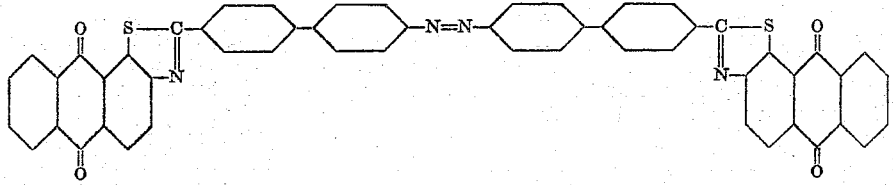

References Cited in the file of this patent

UNITED STATES PATENTS

| | | |
|---|---|---|
| 2,719,838 | Deinet | Oct. 4, 1955 |
| 2,719,839 | Deinet | Oct. 4, 1955 |
| 2,719,840 | Deinet | Oct. 4, 1955 |
| 2,719,841 | Deinet | Oct. 4, 1955 |
| 2,719,842 | Deinet | Oct. 4, 1955 |

FOREIGN PATENTS

| | | |
|---|---|---|
| 1,059,420 | France | Nov. 10, 1953 |